United States Patent
Jane et al.

(10) Patent No.: US 10,692,169 B2
(45) Date of Patent: Jun. 23, 2020

(54) GRAPHICS DRIVER VIRTUAL CHANNELS FOR OUT-OF-ORDER COMMAND SCHEDULING FOR A GRAPHICS PROCESSOR

(71) Applicant: Apple Inc., Cupertino, CA (US)

(72) Inventors: Jason P. Jane, San Jose, CA (US); Michael J. Swift, Brooklyn, NY (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/202,689

(22) Filed: Nov. 28, 2018

(65) Prior Publication Data

US 2020/0104968 A1   Apr. 2, 2020

Related U.S. Application Data

(60) Provisional application No. 62/738,847, filed on Sep. 28, 2018.

(51) Int. Cl.
*G06T 1/20*   (2006.01)
*G06T 1/60*   (2006.01)

(52) U.S. Cl.
CPC . *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 8,310,492 B2 | 11/2012 | McCrary |
| 8,537,169 B1 | 9/2013 | Bolz |
| 8,675,000 B2 | 3/2014 | Labour |
| 8,984,519 B2 | 3/2015 | Cadambi |
| 9,142,004 B2 | 9/2015 | Abiezzi |
| 9,679,346 B2 | 6/2017 | Begeman |
| 2002/0063704 A1 | 5/2002 | Sowizral |
| 2010/0013842 A1 | 1/2010 | Green |
| 2013/0057563 A1 | 3/2013 | Persson |
| 2014/0043342 A1 | 2/2014 | Goel |
| 2014/0125672 A1 | 5/2014 | Winternitz |

(Continued)

OTHER PUBLICATIONS

Suzuki et al., "GPUvm: GPU Virtualization at the Hypervisor", IEEE, 2016. (Year: 2016).*

(Continued)

*Primary Examiner* — Nicholas R Wilson
(74) *Attorney, Agent, or Firm* — Blank Rome LLP

(57) ABSTRACT

Systems, methods, and computer readable media to perform out-of-order command scheduling for a graphics processor are described. A graphics driver receives commands committed to a graphics processor for execution. The graphics driver queues a first command to a first graphics driver virtual channel that submits commands to the graphics processor for execution. The first command is associated with a first set of resources. The graphics driver determines whether a second set of resources associated with the second command depends on the first set of resources. The graphics driver queues the second command to the first graphics driver virtual channel based on a determination that the second set of resources depends on the first set of resources. The graphics driver queues the second command to a second virtual channel based on a determination that the second set of resources does not depend on the first set of resources.

20 Claims, 10 Drawing Sheets

(56) References Cited

U.S. PATENT DOCUMENTS

2014/0184623 A1    7/2014   Frascati
2015/0199788 A1    7/2015   Wolfe
2017/0300361 A1   10/2017   Lanka

OTHER PUBLICATIONS

International Search Report and Written Opinion received in PCT Patent Application No. PCT/US2016/032452, dated Aug. 12, 2016.

\* cited by examiner

| | | | | |
|---|---|---|---|---|
| APPLICATION A 870 | PHOTOS 871 | QUICKEN 872 | IMOVIE 873 | APPLICATION B 874 |
| OTHER APPLICATION SERVICES 860 | SPRITE KIT 861 | SCENE KIT 862 | CORE ANIMATION 863 | CORE GRAPHICS 864 |
| O/S SERVICES 850 | OPENGL OR OPENCL 851 | METAL 852 | USER SPACE DRIVERS 853 | SOFTWARE RASTERIZER 854 |
| O/S KERNEL 845 | | | | |
| HARDWARE 840 | | | | |

GRAPHICS DRIVER VIRTUAL CHANNELS FOR OUT-OF-ORDER COMMAND SCHEDULING FOR A GRAPHICS PROCESSOR

BACKGROUND

This disclosure relates generally to scheduling commands for a graphics processor. More particularly, but not by way of limitation, this disclosure relates to out-of-order command scheduling for a graphics processor based on command dependency.

Computers, mobile devices, and other computing systems typically have at least one programmable processor, such as a central processing unit (CPU) and other programmable processors specialized for performing certain processes or functions (e.g., graphics processing). Examples of a programmable processor specialized to perform graphics processing operations include a GPU, a digital signal processor (DSP), a field programmable gate array (FPGA), and/or a CPU emulating a GPU. GPUs, in particular, comprise multiple execution cores (also referred to as shader cores) designed to execute commands on parallel data streams, making them more effective than general-purpose processors for operations that process large blocks of data in parallel. For instance, a CPU functions as a host and hands-off specialized parallel tasks to the GPUs. Specifically, a CPU can execute an application stored in system memory that includes graphics data associated with a video frame. Rather than processing the graphics data, the CPU forwards the graphics data to the GPU for processing; thereby, freeing the CPU to perform other tasks concurrently with the GPU's processing of the graphics data.

User space applications typically utilize a graphics application program interface (API) to access (e.g., indirect or near-direct access) a GPU for the purposes of improving graphics and compute operations. To access the GPU, a user space application institutes API calls that generate a series of commands for a GPU to execute. For example, the graphics API causes a CPU to encode commands within a command buffer that is eventually submitted to the GPU for execution. The order the CPU submits the commands generally determines the order the GPU executes the commands (e.g., first-in-first out (FIFO)). However, because a GPU are intrinsically parallel, the order the CPU submits commands to the GPU may not be the most efficient manner for the GPU to execute the commands. In some situations, the order the CPU submits commands to the GPU could cause "pipeline bubbles" that increase processing latency and underutilizes the GPU's parallel architecture.

SUMMARY

In one embodiment, a method to reorder commands submitted to a graphics processor. The example method receives a first command and a second command committed to a graphics processor for execution. The example method allocates the first command to a first virtual channel that submits commands to the graphics processor for execution, where the first command is associated with a first set of resources. The example method determines whether a second set of resources associated with the second command depends on the first set of resources. Each resource in the second set of resources represents a section of memory that relates to submitting the second command for execution on the graphics processor. In accordance with a determination that the second set of resources depends on the first set of resources, the example method allocates the second command to the first virtual channel.

In another embodiment, a system that comprises memory comprising instructions and at least one processor coupled to memory, where the instructions, when executed, causes the at least one processor to obtain a first command and a second command committed to a graphics processor for execution. The at least one processor assigns the first command to a first graphics driver virtual channel that submits commands to the graphics processor for execution, where the first command is associated with a first set of resources and the first graphics driver channel submits commands from a graphics driver to a firmware for the graphics processor. The at least one processor determines whether a second set of resources associated with the second command depends on the first set of resources. Each resource in the second set of resources represents a section of memory for submitting the second command to the graphics processor. In accordance with a determination that that the second set of resources does not depend on the first set of resources, the at least one processor assigns the second command to a second virtual channel that submits commands to the graphics processor for execution.

In yet another embodiment a method comprising: receiving a command buffer committed to a graphics processor for execution, wherein the command buffer includes a first command and a second command. The example method queues a first command to a first kernel driver virtual channel that submits commands to the graphics processor for execution, where the first command is associated with a first set of resources. The example method then determines whether a second set of resources associated with the second command depends on the first set of resources. Each resource in the second set of resources represents a section of memory that relates to submitting the second command for execution on the graphics processor. Afterwards, the example method queues the second command to the first kernel driver virtual channel based on a determination that the second set of resources depends on the first set of resources.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

While certain embodiments will be described in connection with the illustrative embodiments shown herein, this disclosure is not limited to those embodiments. On the contrary, all alternatives, modifications, and equivalents are included within the spirit and scope of this disclosure as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

FIG. 8 is a block diagram of an embodiment of a software layer and architecture where embodiments of the present disclosure may operate.

DETAILED DESCRIPTION

Figure 1:
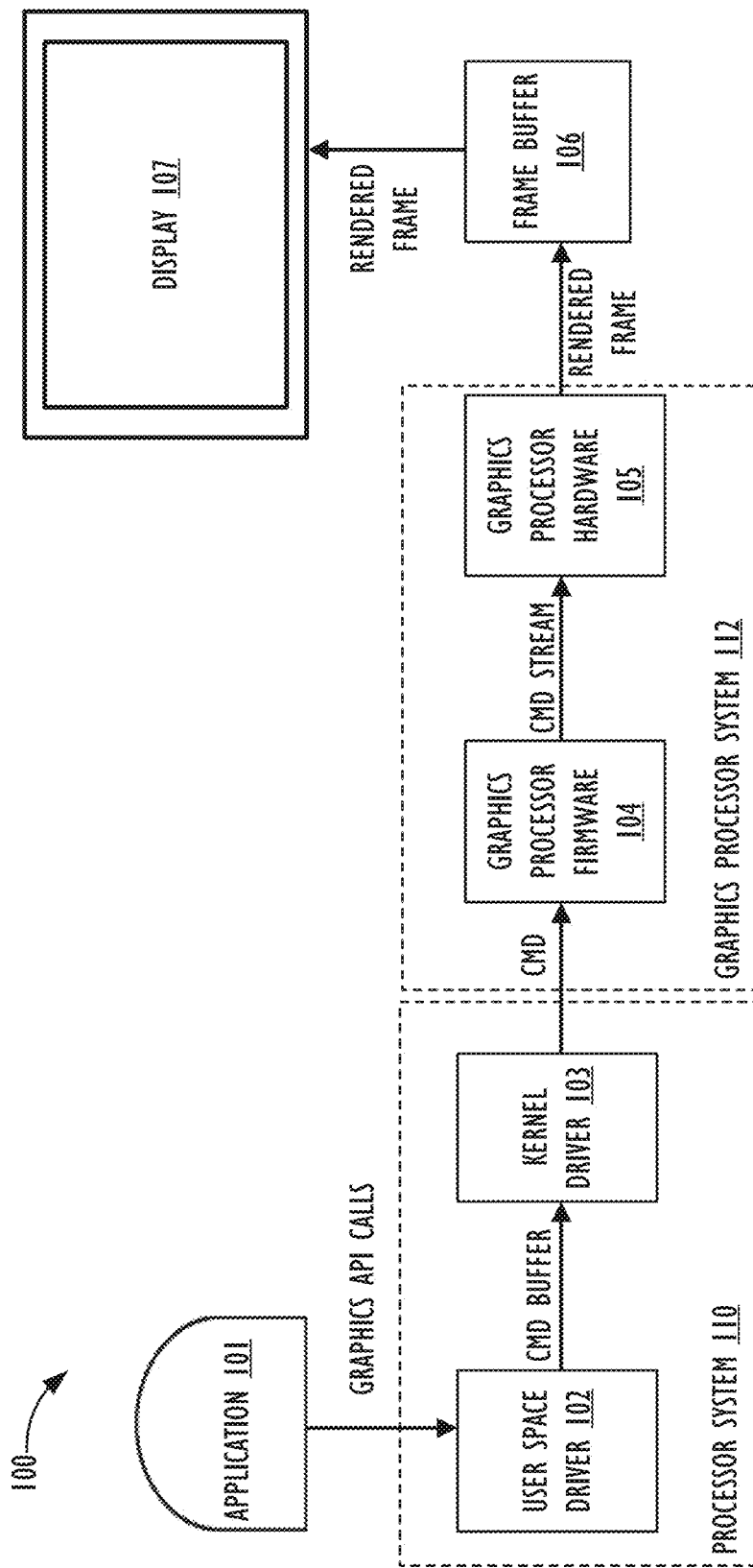
FIG. 1 is a diagram of a graphics processing path where embodiments of the present disclosure may operate.

This disclosure includes various example embodiments that reorder commands submitted to a graphics processor based on command dependencies. In one embodiment, a graphics driver (e.g., a kernel driver for the graphics processor) receives multiple commands from one or more command buffers according to a submission order. Each command is associated with a resource list that identifies resources attached to the command. The graphics driver analyzes the resource list and determines relationships amongst the submitted commands. For example, the graphics driver can analyze the resource list and determine whether a command the graphics driver is currently analyzing depends on one or more resources of a previous command allocated to an existing graphics driver virtual channel. If the current command depends on resources from the previous command, the graphics driver allocates the currently analyzed command to the same graphics driver (e.g., kernel driver) virtual channel. If the currently analyzed command fails to depend on any commands previously allocated to the graphics driver virtual channel, then the graphics driver allocates the currently analyzed command to a new graphics driver virtual channel. The graphics processor firmware then uses a heuristic operation to select which graphics driver virtual channels to execute. As an example, when more than one graphics driver virtual channel includes commands that are ready for submission, the graphics processor firmware may utilize a submission identifier to determine which graphics driver virtual channel to execute first. The submission identifier indicates the initial submission order for the commands prior to implementing the reordering operation.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed principles. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "kernel" in this disclosure refers to a computer program that is part of a core layer of an operating system (e.g., Mac OSX™) typically associated with relatively higher or the highest security level. The "kernel" is able to perform certain tasks, such as managing hardware interaction (e.g., the use of hardware drivers), schedule work for a hardware devices, and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The disclosure also uses the term "compute kernel," which has a different meaning and should not be confused with the term "kernel" or "operating system kernel." In particular, the term "compute kernel" refers to a program for a graphics processor (e.g., GPU, DSP, or FPGA). In the context of graphics processing operations, programs for a graphics processor are classified as a "compute kernel" or a "shader." The term "compute kernel" refers to a program for a graphics processor that performs general compute operations (e.g., compute commands), and the term "shader" refers to a program for a graphics processor that performs graphics operations (e.g., render commands).

As used herein, the term "application program interface (API) call" in this disclosure refers to an operation an application is able to employ using a graphics API. Examples of API calls include draw calls for graphics operations and dispatch calls for computing operations. Examples of graphics API include OpenGL®, Direct3D®, or Metal® (OPENGL is a registered trademark of Silicon Graphics, Inc.; DIRECT3D is a registered trademark of Microsoft Corporation; and METAL is a registered trademark of Apple Inc.). Generally, a graphics driver translates API calls into commands a graphics processor is able to execute. The term "command" in this disclosure refers to a command encoded within a data structure, such as command buffer or command list. The term "command" can refer to a "render command" (e.g., for draw calls) and/or a "compute command" (e.g., for dispatch calls) that a graphics processor is able to execute.

For the purposes of this disclosure, the term "processor" refers to a programmable hardware device that is able to process data from one or more data sources, such as memory. One type of "processor" is a general-purpose processor (e.g., a CPU or microcontroller) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include a GPU, DSPs, FPGAs, and/or a CPU emulating a GPU. In one or more embodiments, graphics processors are also able to perform non-specialized operations that a general-purpose processor is able to perform. As previously presented, examples of these general compute operations are compute commands associated with compute kernels.

As used herein, the term "graphics driver virtual channel" refers to an allocation of memory (e.g., a buffer) for ordering and submitting commands between a graphics driver and a graphics processor (e.g., graphics processor firmware). The graphics driver obtains commands from one or more command buffers and order commands based on command dependency into one or more "graphics driver virtual channels." In one or more embodiments, a "graphics driver virtual channel" represents a "kernel driver virtual channel," which specifically stores and submits commands from the kernel driver to the graphics processor (e.g., graphics processor firmware). As used herein, the term "command dependency" refers to the condition where one command is dependent on a resource of one or more other commands before the command is ready to be submitted to a graphics processor for execution. The term "graphics driver virtual channel," "kernel driver virtual channel," and "command dependency" are discussed in more detail with reference to FIGS. 1-4.

As used herein, the term "resource" refers to an allocation of memory space for storing data related to executing commands on a graphics processor, such as a GPU. In other words, the term "resource" refers to any memory space that a processor and/or a graphics processor access and/or modify when creating and executing a command. The term "resource" includes graphics API resources (e.g., Metal® resources), graphics driver resources (e.g., user space driver and kernel driver), and graphics firmware resources. Examples of graphics API resources include buffers and textures. Buffers represent an allocation of unformatted memory that can contain data, such as vertex, shader, and compute state data. Textures represents an allocation of memory for storing formatted image data. Examples of graphics driver resources include memory (e.g., buffers) used for performing driver operations, such as context switching data or shader cache spills, and managing hardware. Examples of graphics firmware resource include data structures used to perform data shuffling operations. The term "resource list" refers to a data structure that identifies resources attached to a command.

FIG. 1 is a diagram of a graphics processing path 100 where implementations of the present disclosure may operate. FIG. 1 illustrates an example in which the graphics processing path 100 utilizes a processor system 110 and a graphics processor system 112. The processor system 110 includes one or more general-purpose processors (e.g., CPUs), where each processor has one or more cores. The processor system 110 can also contain and/or communicate with memory, other microcontrollers, and/or any other hardware components a processor may utilize to process commands for graphics processor system 112 to execute. The graphics processor system 112 includes one or more graphics processors (e.g., GPUs), where each graphics processor has one or more execution cores and other computing logic for performing graphics and/or general compute operations. The graphics processor system 112 may also encompass and/or communicate with memory (e.g., memory cache), and/or other hardware components to execute programs, such as shaders or compute kernels. Graphics processor system 112 is able to process shaders with a rendering pipeline and compute kernels with a compute pipeline.

FIG. 1 illustrates that application 101 (e.g., a user space application) generates graphics API calls for the purpose of encoding commands for the graphics processor system 112 to execute. To generate the graphics API calls, application 101 includes code written with a graphics API. The graphics API (e.g., Metal®) represents a published and/or standardized graphics library and framework that define functions and/or other operations that application 101 is able to have with a graphics processor system 112. For example, the graphics API allows application 101 to be able to control the organization, processing, and submission order of commands, as well as the management of associated data and graphics API resources for those commands.

In one or more embodiments, application 101 is a graphics application that invokes the graphics API to convey a description of a graphics scene. Specifically, the user space driver 102 receives graphics API calls from application 101 and maps the graphics API calls to operations understood and executable by the graphics processor system 112. For example, the user space driver 102 can translate the API calls into commands encoded within command buffers before being transferred to kernel driver 103. The translation operation may involve the user space driver 102 compiling shaders and/or compute kernels into commands executable by the graphics processor system 112. The command buffers are then sent to the kernel driver 103 to prepare and submit the command buffers for execution on the graphics processor system 112. As an example, the kernel driver 103 may perform memory allocation and scheduling of the command buffers to be sent to the graphics processor system 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104 obtains commands that processor system 110 submits for execution. The graphics processor firmware 104 can perform a variety of operations to manage the graphics processor hardware 105, such as powering on and off the graphics processor hardware 105 and/or scheduling the order of commands that the graphics processor hardware 105 receives for execution. With reference to FIG. 1 as an example, the graphics processor firmware 104 can be implemented by a graphics microcontroller that boots up firmware. Specifically, the graphics microcontroller could be embedded in the same package as a graphics processor within the graphic processor system 112 and setup to pre-process commands for the graphics processor. In other implementations, the graphics microcontroller is physically separated from the graphics processor. The graphics microcontroller that runs graphics processor firmware 104 may be located on a different power domain than the graphics processor hardware 105 enabling the graphics microcontroller to be powered on and off independently from powering graphics processor hardware 105.

After scheduling the commands, in FIG. 1, the graphics processor firmware 104 sends command streams to the graphics processor hardware 105. The graphics processor hardware 105 then executes the commands within the command streams according to the order the graphics processor hardware 105 receives the commands. The graphics processor hardware 105 includes multiple (e.g., numerous) execution cores, and thus, can execute a number of received commands in parallel. The graphics processor hardware 105 then outputs rendered frames to frame buffer 106. In one embodiment, the frame buffer 106 is a portion of memory, such as a memory buffer, that contains a bitmap that drives display 107. Display 107 subsequently accesses the frame buffer 106 and converts (e.g., using a display controller) the rendered frame (e.g., bitmap) to a video signal for display.

In one or more embodiments, graphics driver (e.g., kernel driver 103) is able to reorder the commands submitted to graphics processor system 112 (e.g., graphics processor firmware 104) based on command dependencies. Using FIG. 1 as an example, the user space driver 102 creates a command queue (e.g., command queue 210 shown in FIG. 2) that submits command buffers to kernel driver 103. The command queue typically acts as FIFO submission operation to control the order command buffers are sent to kernel driver 103. Rather than having the kernel driver 103 and/or graphics processor firmware 104 submit commands to the graphics processor hardware 105 according to the same order kernel driver 103 receives commands, the kernel driver 103 and/or graphics processor firmware 104 is able to perform out-of-order command scheduling that submits commands to the graphics processor hardware 105 according to command dependency.

Command dependency occurs when execution of one command depends on one or more resources from one or more other commands. The command is unable to execute until one or more other commands complete execution. For example, a graphics driver can receive a first command that represents a render command that renders to a texture to produce a scene. Afterwards, the graphics driver receives a second command that causes a read from the same texture and/or performs additional operations to the texture. In this example, the second command is resource dependent on the first command because the second command reads from the texture (e.g., a resource) after the first command completes its write into the texture. Conversely, if the second command represents another render command that renders to a new or different texture, then the second command may not be resource dependent on the first command.

To be able to reorder commands submitted to the graphics processor firmware 104, the graphics driver creates (e.g., user space driver 102 creates) and analyzes (e.g., kernel driver 103 analyzes) a resource list for each command to determine command dependencies. A resource list identifies the resources attached to a specific command. By analyzing the resource list, the graphics driver can determine the relationship from one command to the next command. By determining the command dependences for the commands, the graphics driver is capable of creating one or more graphics driver virtual channels and assigning the commands to the graphics driver virtual channels based on command dependencies. In one or more embodiments, the graphics driver determines command dependencies for commands committed to a specific command queue and does not determine command dependencies for commands assigned to other command queues.

The graphics driver assigns a command to a graphics driver virtual channel according to whether the command is resource dependent on a command queued in an existing graphics driver virtual channel. For example, the graphics driver can analyze the resource list for a current command and determine whether the current command depends on resources from a command already queued to a graphics driver virtual channel. If the current command depends on resources from a queued command, the graphics driver allocates the current command to the existing graphics driver virtual channel. If the currently analyzed command is not resource dependent on any of the commands already queued within existing graphics driver virtual channels, then the graphics driver creates a new graphics driver virtual channel and assigns the current command to the new graphics driver virtual channel.

The graphics processor firmware 104 obtains commands assigned to different graphics driver virtual channels and provide the commands to the graphics processor hardware 105 when the commands become ready for execution. In certain situations, the graphics processor firmware 104 could have commands on multiple graphics driver virtual channels ready for submission. When this occurs, the graphics processor firmware 104 may use a heuristic operation to select which graphics driver virtual channels to execute. As an example, when more than one graphics driver virtual channel includes commands that are ready for submission, the graphics processor firmware 104 may utilize a submission identifier associated with each of the commands to determine which graphics driver virtual channel to execute first. A submission identifier represents the order application 101 submitted the commands based on the graphics API calls. For example, the submission order may be the order the user space driver 102 submits commands to the kernel driver 103.

In one or more embodiments, the graphics driver is able to create a limited number of graphics driver virtual channels. When the graphics driver is unable to create additional graphics driver virtual channels, the graphics driver can assign a non-resource dependent command to one of the existing graphics driver virtual channels using one or more heuristic operations. In one example, the graphics driver can assign the non-resource dependent command according to a designated order of the graphics driver virtual channels (e.g., least recently used). In another example, the graphics driver performs a load balancing operation and assigns the non-resource dependent command to the graphics driver virtual channel with the least number of commands and/or lowest expected latency. The graphics driver could also designate a graphics driver virtual channel (e.g., the first or primary kernel driver virtual channel) to send the non-resource dependent command to when the graphics driver is unable to create any other new graphics driver virtual channel.

Although FIG. 1 illustrates a specific implementation of graphics processing path 100, the disclosure is not limited to the specific implementation illustrated in FIG. 1. For instance, graphics processing path 100 may include other frameworks, APIs, and/or application layer services not specifically shown in FIG. 1. As an example, application 101 may have access to a user interface (UI) framework to animate views and/or user interfaces for application 101. FIG. 1 also does not illustrate all of the hardware components that graphics processing path 100 may utilize (e.g., power management components or memory components, such as system memory).

Additionally or alternatively, even though FIG. 1 illustrates that processor system 110 and graphics processor system 112 are separate devices, other implementations could have the processor system 110 and graphics processor system 112 integrated on a single device (e.g., a system-on-chip). The use and discussion of FIG. 1 is only an example to facilitate ease of description and explanation.

Figure 2:
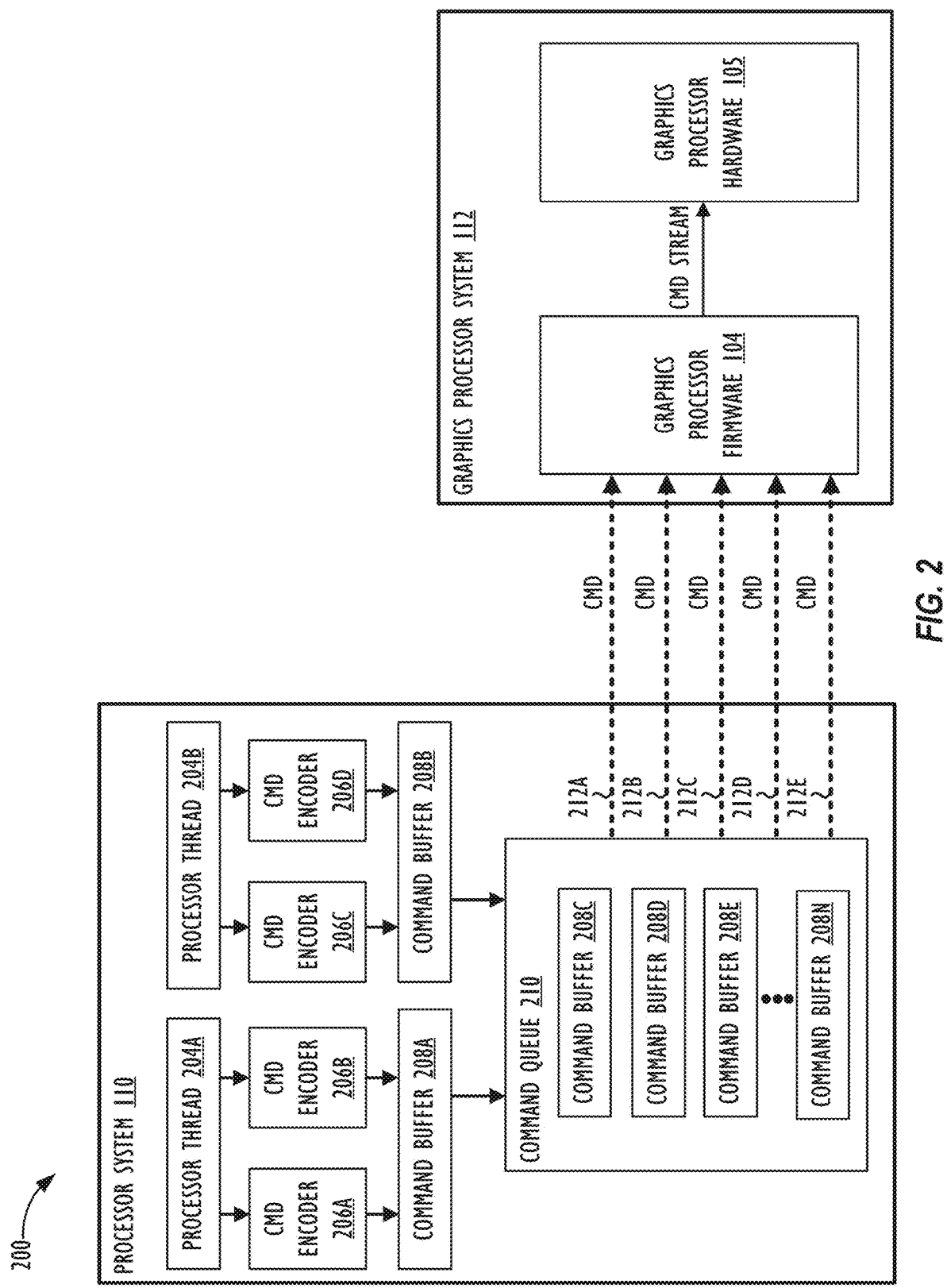
FIG. 2 is a block diagram of a system where embodiments of the present disclosure may operate.

FIG. 2 is a block diagram of a system 200 where embodiments of the present disclosure may operate. Specifically, system 200 is able to implement the graphics processing path 100 shown in FIG. 1. FIG. 2 illustrates that system 200 includes a processor system 110 and a graphics processor system 112. Processor system 110 implements processor threads 204A and 204B. Processor thread 204A is tasked with utilizing command encoders 206A and 206B and processor thread 204B is tasked with utilizing command encoder 206C and 206D. The command encoders 206A and 206B encode commands within command buffer 208A and command encoders 206C and 206D encode commands within command buffer 208B. A different number of processor threads and command encoders can be included in other implementations compared to two processor threads and four command encoders shown in the example of FIG. 2. The command encoders 206A-206D represents encoders that encodes commands into command buffers 208A and 208B for the graphics processor system 112 to execute. Examples of command encoder types include Blit command encoders (e.g., graphics API resource copy and graphics API resource synchronization commands), compute command encoders (e.g., compute commands), and render command encoders (e.g., render commands).

Command buffers 208A and 208B, which are also referred to as "command lists," represent data structures that store a sequence of encoded commands for graphics processor system 112 to execute. Presenting and committing command buffers 208A and 208B allows an application (e.g., developer) to control and designate a submission order of commands to graphics processor system 112. When an application issues one or more graphics API calls that present and commit command buffers 208A and 208B to a graphics driver (e.g., the user space driver 102 shown FIG. 1), command buffers 208A and 208B transition to a state indicating command buffers 208A and 208B are ready to submit to a graphics processor for execution. Additionally, the processor system 110 is unable to encode any additional commands into command buffers 208A and 208B after processor system 110 commits command buffers 208A and 208B for submission. Prior to the graphics API calls that commit command buffers 208A and 208B, the command buffers 208A and 208B are unavailable for submission to the graphics processor and additional commands can be encoded into the command buffers 208.

As shown in FIG. 2, the processor system 110 organizes the command buffers 208 into a command queue 210. Although FIG. 2 illustrates a single command queue 210, other embodiments could have multiple command queues 210 that store command buffers 208. After committing command buffers 208A and 208B, the commands buffers 208 are sent to command queue 210 according to a submission order that an application (e.g., application 101 in FIG. 1) designates. FIG. 2 depicts that command queue 210 contains command buffers 208C-208N, where command buffer 208C is at the top of the command queue 210 and has been designated as the next command buffer 208C to be sent to graphics processor system 112 for execution. To alter the submission order that an application and/or developer defines, processor system 110 creates graphics driver virtual channels 212A-216 that submit commands to graphics processor firmware 104.

The processor system 110 utilizes the graphics driver virtual channels 212A-216 to allow reordering of commands allocated for command queue 210. As previously discussed, processor system 110 creates and analyzes a resource list for each command to determine command dependencies. From analyzing the resource list, the processor system 110 can determine the relationship from one command to the next command in command buffer 208 and command queue 210. By determining the command dependences for the commands, the processor system 110 is capable of creating one or more graphics driver virtual channels 212A-216 and assigning the commands to the graphics driver virtual channels 212A-216. In one or more embodiments, the processor system 110 determines command dependencies for commands that belong to the same command queue 210. Stated another way, the processor system 110 does not determine dependencies for commands queued in different command queues 210.

In FIG. 2, processor system 110 also creates graphics driver virtual channels 212A-216 not only based on command dependencies, but also based on the parallel architecture of the graphics processor system 112. The graphics processor system 112 could have an architecture that include a variety of engines that perform operations in parallel. Examples of different engines graphics processor system 112 could have include a vertex engine, a compute engine, a three dimensional (3D) engine, a two dimensional (2D) engine, a Blit engine, or combinations thereof. Command buffers 208 could include commands that have command types that correspond to being processed by the different engines. As an example, a command buffer 208 could include a render command that the vertex engine processes and a compute command that the compute engine processes.

Figure 3A:
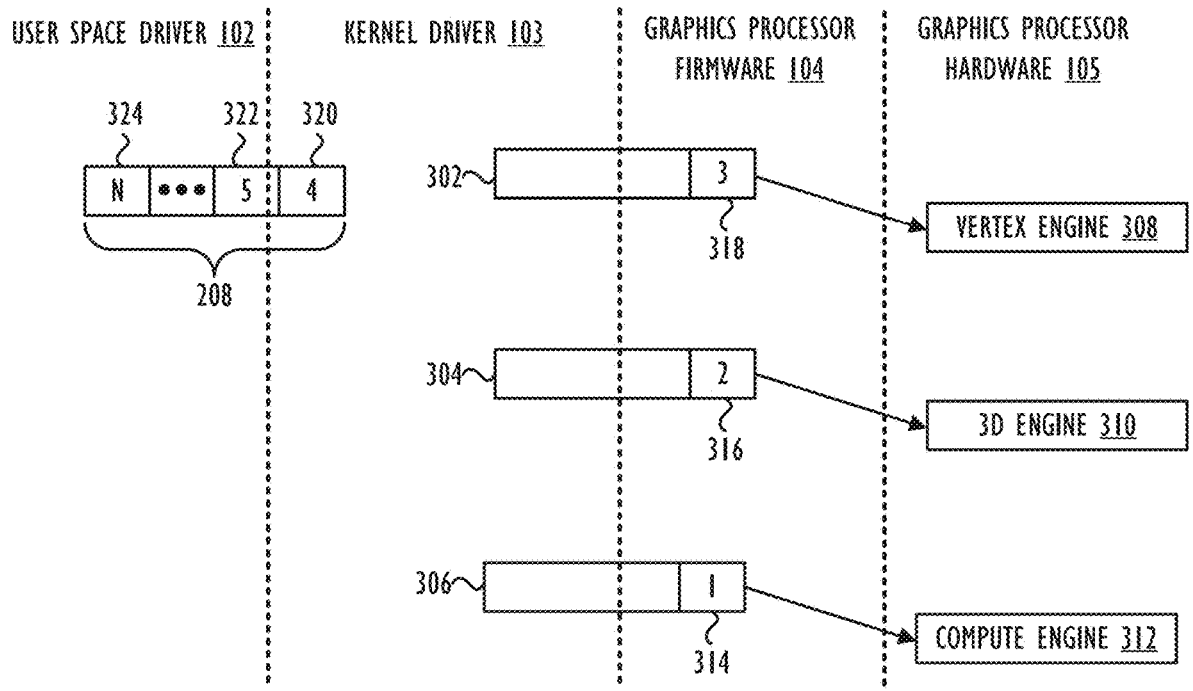
FIG. 3A illustrates a graphics processing path where a kernel driver is analyzing commands in a command buffer to determine command dependencies.

The processor system 110 is able to create separate graphics driver virtual channels 212A-216 for each command type. As shown in FIG. 2, graphics driver virtual channels 212A and 212B are for queuing commands with first command type (e.g., for vertex engine processing); graphics driver virtual channels 214A and 214B are for queueing commands with a second command type (e.g., for 3D engine processing); and graphics driver virtual channel 216 is for queueing commands with a third command type (e.g., for compute engine processing). To assign commands to graphics driver virtual channels 212A-216, the processor system 110 can determine command dependencies for commands that have the same command type. If a current command the processor system 110 is analyzing depends on resources from a queued command with the same command type, the graphics driver allocates the current command to one of the existing graphics driver virtual channels 212A-216 associated with the queued command. If the currently analyzed command is not resource dependent on any of the commands already queued within one of the existing graphics driver virtual channels 212A-216 for the same command type, then graphics driver creates a separate graphics driver virtual channel associated with the same command type. Afterwards, the processor system 110 assigns the current command to the new graphics driver virtual channel that is associated with the same command type. FIGS. 3A-4 illustrate examples of creating and assigning commands to a new or existing graphics driver virtual channel for the same command type.

FIGS. 3A-3D illustrate a graphics processing path for reordering commands submitted to a graphics processor with a single engine architecture. In FIGS. 3A-3D, the user space driver 102 sends a command buffer 208 to the kernel driver 103 according to a command queue (not shown in FIG. 3A). For example, user space driver 102 sends command buffers 208 within a command queue to kernel driver 103 based on a FIFO submission order. A command queue may receive command buffer 208 after an application provides instructions to present and commit the command buffer 208 for execution on a graphics processor. Prior to presenting and committing the command buffer 208, the command buffer 208 may not be ready to submit to a graphics processor for execution. As shown in FIGS. 3A-3D, command buffer 208 includes multiple commands 320, 322, and 324.

The kernel driver 103 is able to create multiple graphics driver virtual channels to submit commands to a graphics processor. In FIGS. 3A-3D, the graphics driver virtual channels are shown as kernel driver virtual channels 302, 304, and 306 that queue commands for the kernel driver 103 and/or the graphics processor firmware 104. The kernel driver 103 sets each kernel driver virtual channels 302, 304, and 306 to queue a specific command type. As shown in FIGS. 3A-3D, kernel driver virtual channel 302 queues a command 318 for vertex engine 308 to process; kernel driver virtual channel 304 queues a command 316 for 3D engine 310 to process; and kernel driver virtual channel 306 queues a command 314 for compute engine 312 to process. Each additional command queued in one of the kernel driver virtual channel 302, 304, and 306 (e.g., kernel driver virtual channel 302) would have the same command type as the command already queued in the kernel driver virtual channel (e.g., command 318). For example, kernel driver virtual channel 302 would not queue commands that are for 3D engine 310 or compute engine 312 to process.

For FIGS. 3A-3D, commands 314, 316, and 318 represent the next commands within each of the existing kernel driver virtual channels 302, 304, and 306 the kernel driver 103 will submit to a graphics processor. In particular, command 318 is the next command queued to submit to vertex engine 308; command 316 is the next command queued to submit to the 3D engine 310; and command 314 represents the next command queued to submit to the compute engine 312. In one or more embodiments, any additional command that kernel driver 103 allocates to one of the existing kernel driver virtual channel (e.g., kernel driver virtual channel 304) will not be submitted to the graphics processor hardware 105 until the previously allocated command (e.g., command 316) completes execution. In other words, the kernel driver virtual channels 302, 304, and 306 act as FIFO buffers when submitting commands to graphics processor firmware 104.

Even though commands 314, 316, and 318 are the next commands the kernel driver 103 queued in existing kernel driver virtual channels 302, 304, and 306, respectively, commands 314, 316, and 318 can be either in a wait state or a ready state. Commands 314, 316, and 318 may be in the wait state if commands 314, 316, and 318 are resource dependent on a command that the graphics processor hardware 105 has not finished executing. In one or more embodiments, the kernel driver 103 and/or graphics processor firmware 104 may track the completion of command execution by utilizing event information (e.g., stamp values and/or index information) obtained from an event machine. The event machine could track one or more graphics processor channels for a variety engines (e.g., compute engine, vertex engine, 3D engine) to monitor when a graphics processor finishes execution of a submitted command and update the event information. Utilizing the updated event information from the event machine, the kernel driver 103 and/or graphics processor firmware 104 are able to determine whether commands 314, 316, and 318 are waiting for commands to finish executing (e.g., depending on resources from a command). If a command does not need to wait for commands to complete execution, the kernel driver 103 and/or the graphics processor firmware 104 may designate commands 314, 316, and 318 as having a ready state for submitting commands to the graphics processor firmware 104.

FIG. 3A illustrates that kernel driver 103 is analyzing commands (e.g., commands 320, command 322, and command 324) in command buffer 208 to determine command dependencies. In one or more embodiments, kernel driver 103 determines whether a command depends on resources from other commands that belong within the same command queue. In other words, the reorder operation that kernel driver 103 performs does not determine command dependencies for commands associated with different command queues. As previous discussed, kernel driver 103 may determine command dependencies by analyzing resource lists for each command. For FIG. 3, kernel driver 103 may analyze the resource lists for commands 320, 322, and 324 within command buffer 208. Based on the command dependencies, kernel driver 103 can assign commands 320, 322, and 324 to the existing kernel driver virtual channels 302, 304, and 306 or new kernel driver virtual channels.

Figure 3B:
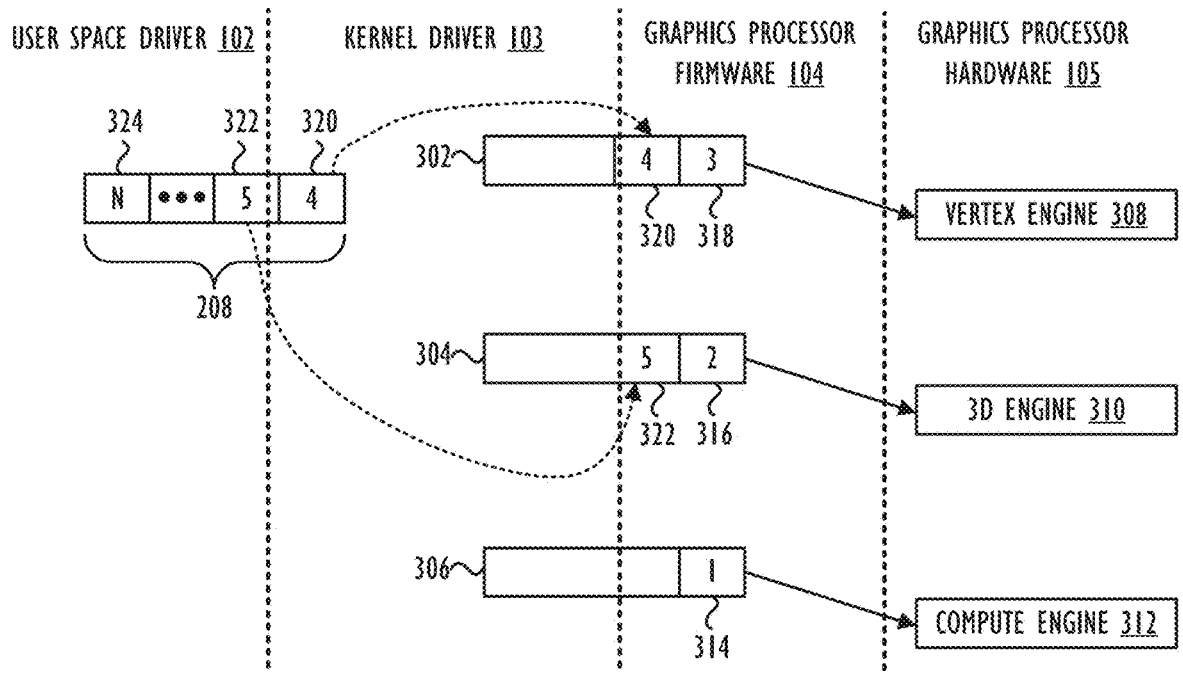
FIG. 3B illustrates a graphics processing path where after analyzing the resource lists for commands, the kernel driver assigns command to separate existing kernel driver virtual channels.
Figure 4:
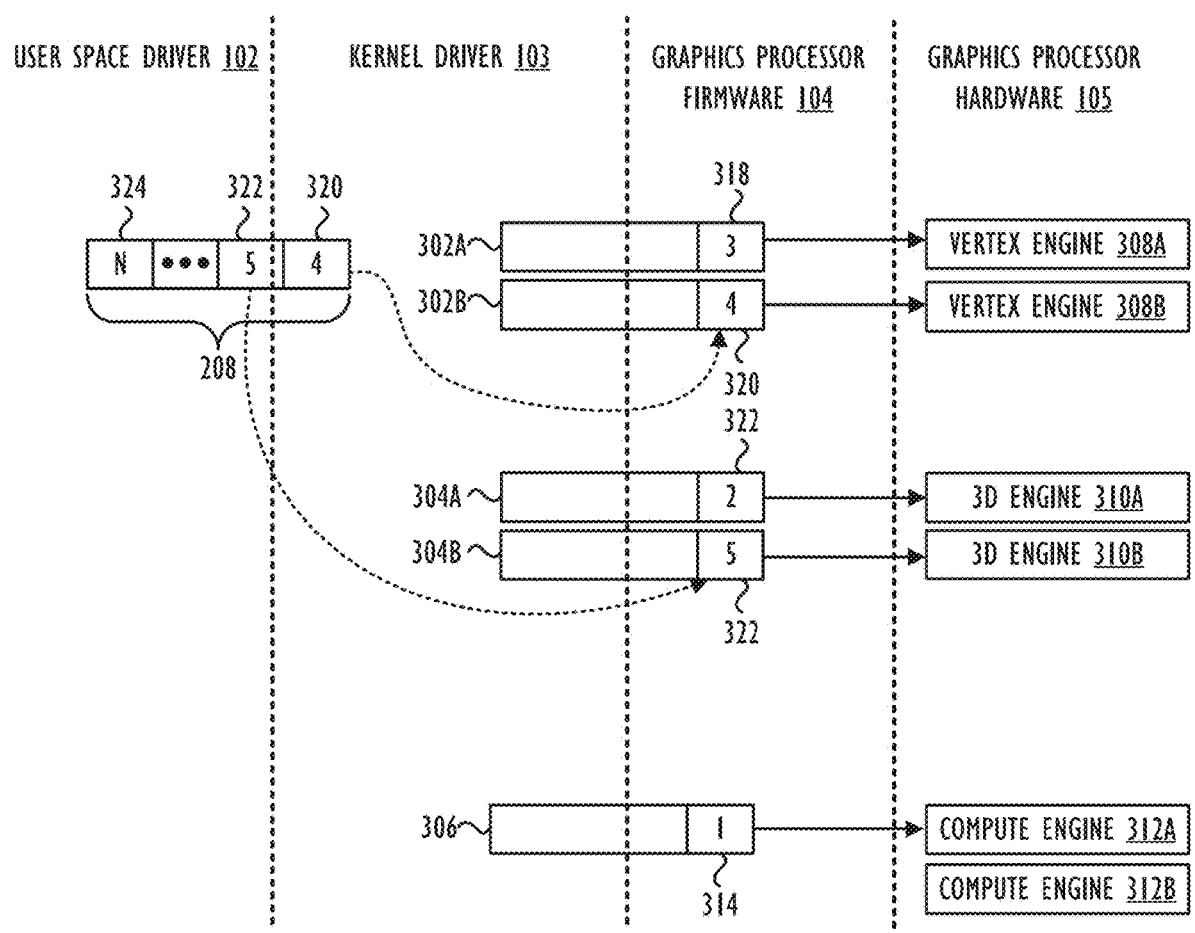
FIG. 4 illustrate a graphics processing path for reordering commands submitted to a graphics processor with a multi-engine architecture.

FIG. 3B illustrates that after analyzing the resource lists for commands 320 and 322, kernel driver 103 assigns command 320 to existing kernel driver virtual channel 302 and command 322 to existing kernel driver virtual channel 304. Specifically, kernel driver 103 determines that command 320 is resource dependent and the same command type as command 318. The kernel driver 103 also determines that command 322 is resource dependent and the same command type as command 316. Because the graphics processor hardware 105 is unable to execute commands 320 and 322 until commands 318 and 322 complete execution, commands 320 and 322 are allocated to existing kernel driver virtual channels 302 and 304, respectively. The kernel driver 103 would experience no to very little latency reduction by placing commands 320 and 322 into new kernel driver virtual channels.

Figure 3C:
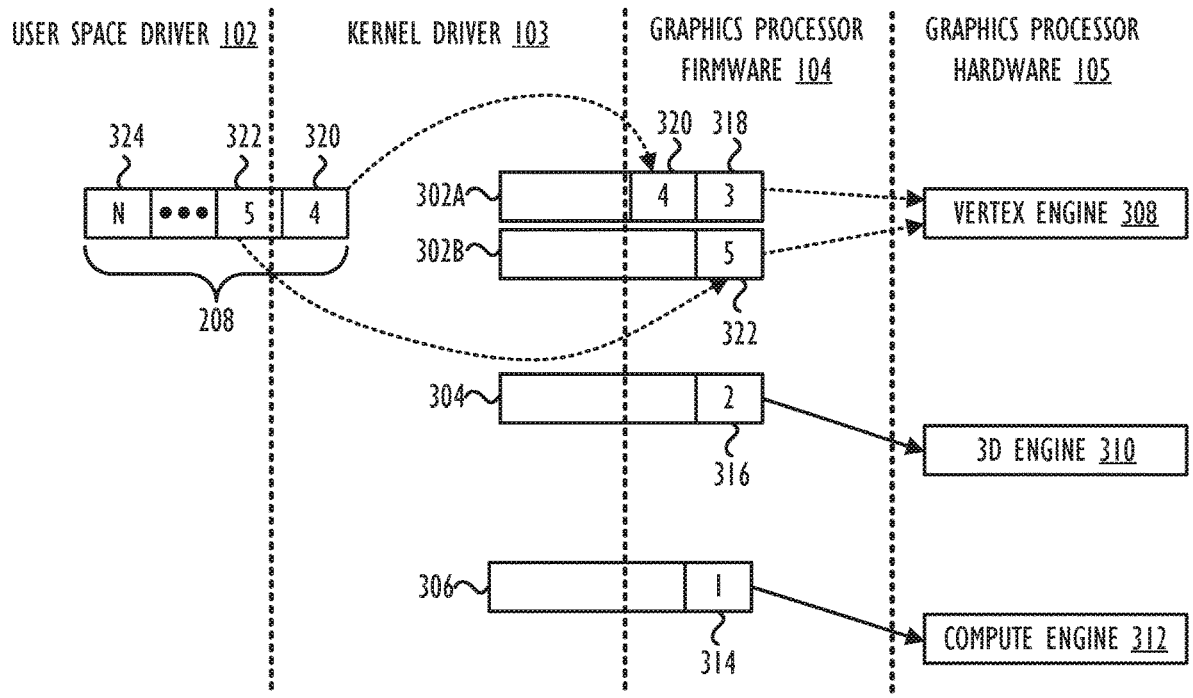
FIG. 3C illustrates a graphics processing path where after analyzing the resource lists for commands, the kernel driver assigns commands to an existing kernel driver virtual channel and a new kernel driver virtual channel.

FIG. 3C illustrates that after analyzing the resource lists for commands 320 and 322, kernel driver 103 assigns command 320 to existing kernel driver virtual channel 302A and command 322 to a new kernel driver virtual channel 302B. Kernel driver virtual channels 302A and 302B represent a set of kernel driver virtual channels designated for the same command type, where both kernel driver virtual channels 302A and 302B submit commands to the vertex engine 308. Kernel driver 103 determines that command 320 is resource dependent and the same command type as command 318. The kernel driver 103 determines that command 322 is not dependent on resources of command 318, but is the same command type as command 318. Because command 322 does not rely on resources from command 318, the graphics processor hardware 105 is able to execute command 322 independently of command 318. To prevent underutilization of the vertex engine 308, the kernel driver 103 creates a second kernel driver virtual channel 302B to submit commands to graphics processor firmware 104. This way the kernel driver 103 is able to modify the submission order by submitting command 322 to the vertex engine 308 prior to command 320, for example, if command 320 is not ready and waiting for command 318 to complete execution.

As shown in FIG. 3C, each of the commands 314, 316, 318, 320, 322, and 324 are tagged with a submission identifier. In particular, command 314 has a submission identifier of 1; command 316 has a submission identifier of 2; command 318 has a submission identifier of 3; command 320 has a submission identifier of 4; command 322 has a submission identifier of 5; and command 324 has a submission identifier of N. The submission identifier represents the order the kernel driver 103 submits commands to the graphics processor without performing a reordering operation. For example, according to the submission identifier, command 320 (e.g., submission identifier 4) would have been submitted to the graphics processor hardware 105 prior to command 322 (e.g. submission identifier 5). However, by allocating command 322 to a different kernel driver virtual channel 302B, the kernel driver 103 and/or graphics processor firmware 104 may submit command 322 (e.g. submission identifier 5) to the graphics processor hardware 105 prior to submitting command 320 (e.g., submission identifier 4) to improve utilization of the graphics processor hardware 105.

When multiple commands that have the same command type, are ready for submission, and are allocated to different kernel driver virtual channels, the graphics processor firmware 104 may perform a heuristic operation to determine which command to submit to graphics processor hardware 105. As an example, in FIG. 3C, commands 318 and 322 are the next commands of their respective kernel driver virtual channels 302A and 302B for submission to the graphics processor hardware 105. If both commands 318 and 322 are in a ready state for submitting to the graphics processor hardware 105, the graphics processor firmware 104 may utilize the submission identifier to determine which command should be sent first for processing on vertex engine 308. In one embodiment, the graphics processor firmware 104 may choose commands with lower/lowest submission identifier value to submit to graphics processor hardware 105. In another embodiment, the graphics processor firmware 104 may choose to commands with higher/highest submission identifier value to submit to graphics processor hardware 105.

Figure 3D:
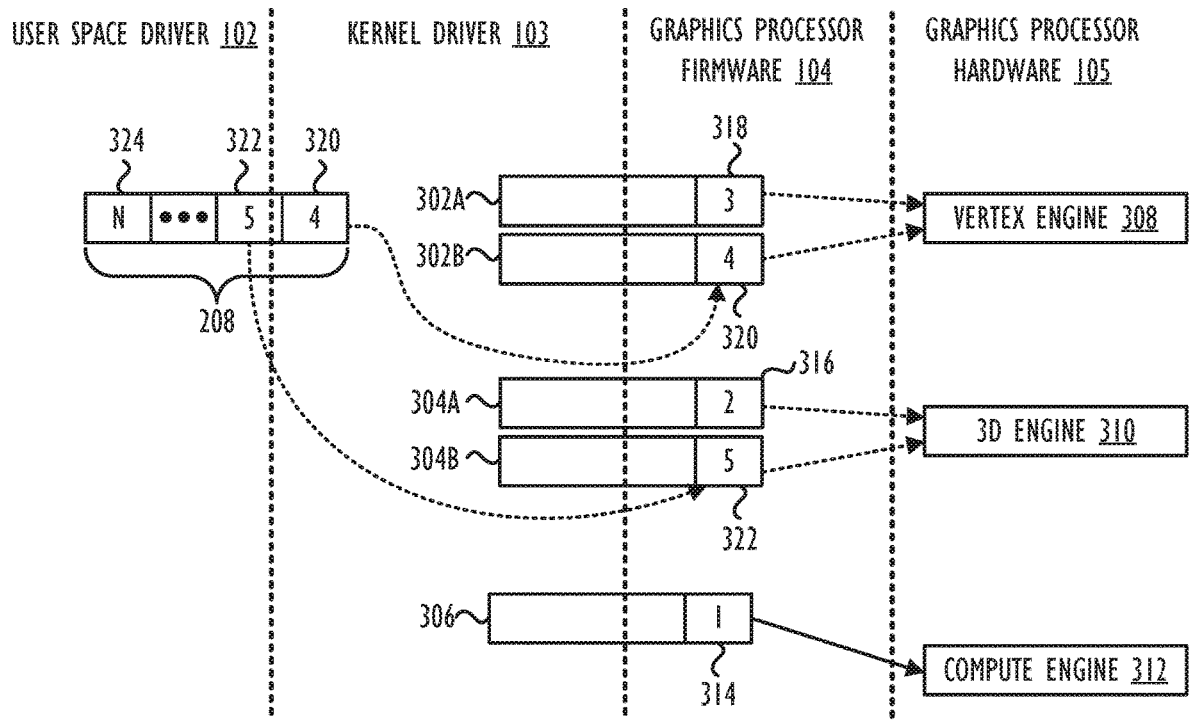
FIG. 3D illustrates a graphics processing path where the kernel driver creates multiple sets of kernel driver virtual channels, where each set of kernel driver virtual channels corresponds to a specific command type.

FIG. 3D illustrates that kernel driver 103 can create multiple sets of kernel driver virtual channels, where each set of kernel driver virtual channels corresponds to a specific command type. Kernel driver virtual channels 302A and 302B are for processing on vertex engine 308 and kernel driver virtual channels 304A and 304B are for processing on the 3D engine 310. Kernel driver 103 determines that command 320 is not resource dependent and is the same command type as command 318 and command 322 is independent of the resources for command 316, but is the same command type as command 316. Kernel driver 103 does not allocate command 322 to existing kernel driver virtual channels 302A and 302B or create a new kernel driver virtual channel (e.g., kernel driver virtual channels 302C) since command 322 is a different command type.

When multiple commands are ready for submission, the graphics processor firmware 104 could perform a separate heuristic operation for each set of kernel driver virtual channels. For example, the graphics processor firmware 104 compares the submission identifier between command 318 and 320 to determine the next command to provide to the vertex engine 308. Additionally, the graphics processor firmware 104 compares the submission identifier between commands 316 and 322 to determine the next command to provide to the 3D engine 310. The graphics processor firmware 104 does not compare submission identifiers for all four kernel driver virtual channels 302A, 302B, 304A, and 304B since kernel driver virtual channels 302A and 302B queue commands that have different command types than kernel driver virtual channels 304A and 304B.

FIG. 4 illustrate a graphics processing path for reordering commands submitted to a graphics processor with a multi-engine architecture. FIG. 4 is similar to FIG. 3D except that the graphics processor hardware 105 includes multiple vertex engines 308A and 308B, multiple 3D engines 310A and 310B, and multiple compute engines 312A and 312B. For the multi-engine architecture shown in FIG. 4, when kernel driver 103 creates multiple kernel driver virtual channels for a specific command type, the graphics processor firmware 104 can schedule each of the kernel driver virtual channels with the same specific command type to different processing engines. In FIG. 4, commands in kernel driver virtual channels 302A and 302B are sent to vertex engines 308A and 308B, respectively. Commands in kernel driver virtual channels 304A and 304B are sent to 3D engines 310A and 310B, respectively. Having the kernel driver 103 create multiple kernel driver virtual channels improves the utilization of the parallel operation of the graphics processor hardware 105.

Figure 5:
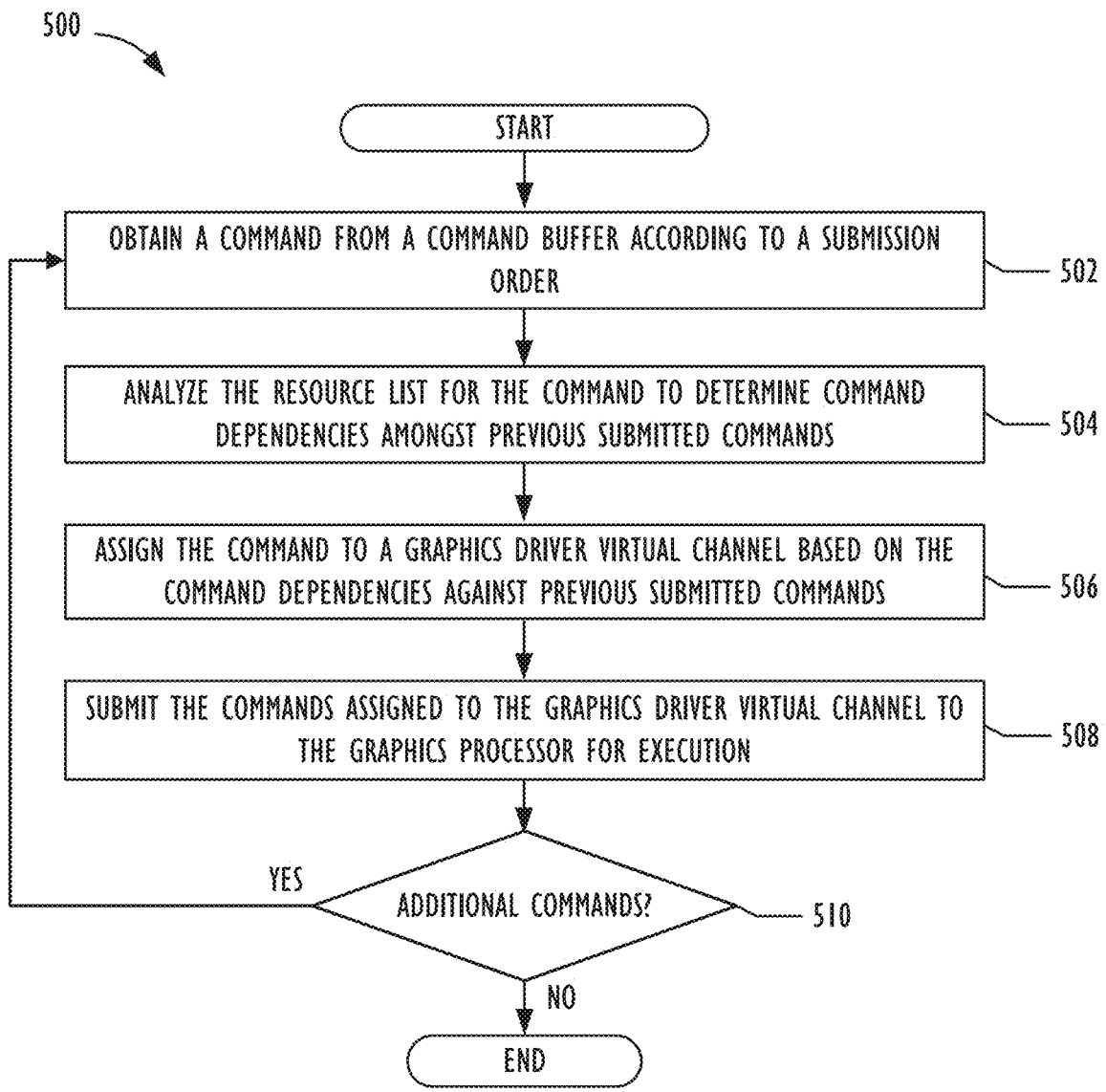
FIG. 5 depicts a flowchart illustrating a graphics processing operation that performs out-of-order scheduling for a graphics processor.

FIG. 5 depicts a flowchart illustrating a graphics processing operation 500 that performs out-of-order scheduling for a graphics processor. Operation 500 assigns a command to a graphics driver virtual channel according to whether the command is resource dependent on a command allocated in an existing graphics driver virtual channel. In one embodiment, operation 500 may be implemented by the kernel driver 103 and/or graphics processor firmware 104 shown in FIG. 1 or more generally by graphics driver 632 shown in FIG. 6. The use and discussion of FIG. 5 is only an example to facilitate explanation and is not intended to limit the disclosure to this specific example. For example, although FIG. 5 illustrates that the blocks within operation 500 are implemented in a sequential order, operation 500 is not limited to this sequential order.

Operation 500 may start at block 502 and obtain a command from a command buffer according to a submission order. The submission order may correspond to an application's (e.g., developer) designations of the order commands should be sent to graphics processor. Operation 500 may then move to block 504 and analyze the resource list for the command to determine command dependencies amongst previous submitted commands. Afterwards, operation 500 may then move to block 506 to assign the command to a graphics driver virtual channel based on the command dependencies against previous submitted commands.

At block 506, operation 500 can assign the command to an existing graphics driver virtual channel or a new graphics driver virtual channel. In one example, based on analyzing the resource list, operation 500 determines whether a command depends on resources from a command previously allocated to a graphics driver virtual channel. If the current command depends on resources from a previously allocated command, operation 500 allocates the current command to the existing graphics driver virtual channel. If the currently analyzed command is not resource dependent on any of the commands previously allocated within existing graphics driver virtual channels, then operation 500 creates a new graphics driver virtual channel and assigns the current command to the new graphics driver virtual channel. In another example, if the command depends on resources from multiples commands allocated to multiple existing graphics driver virtual channel, operation 500 may implement a heuristic operation to allocate the command to one of the existing graphics driver virtual channels. Examples of heuristic operations to select one of the existing graphics driver virtual channels include a least recently used operation, least number of commands stored in the graphics driver virtual channel operation, lowest expected latency operation, or a round robin operation.

In one or more embodiments, operation 500 may assign the command to a graphics driver virtual channel based on command dependency and command type. FIGS. 3A-3D are examples of operation 500 assigning commands according to command dependency and command type. If operation 500 determines that a command is resource dependent on an allocated command with the same command type, operation 500 allocates the command to the same graphics driver virtual channel. If the analyzed command is not resource dependent on any of the commands already queued within existing graphics driver virtual channels associated with the same command type, then operation 500 creates a separate graphics driver virtual channel. Afterwards, operation 500 assigns the current command to the new graphics driver virtual channel that is associated with the same command type.

Operation 500 may then move to block 508 and submit the command assigned to the graphics driver virtual channel to the graphics processor for execution. The command within a graphics driver virtual channel may be in a wait state, where before operation 500 submits the command to the graphics processor (e.g., graphic processor hardware 105 in FIG. 1), operation 500 is waiting for one or more other commands to finish executing. If a command does not depend on a previous command or the graphics processor has executed all of the previous commands the command depends on, then the command is in a ready state. After transitioning to a ready state, operation 500 is able to submit the command for the graphics processor. Operation 500 then move to block 510 to determine whether additional commands need to be submitted to the graphics processor. If operation 500 determines there are additional commands to be submitted, operation 500 loops back to block 502; otherwise, operation 500 ends.

Figure 6:
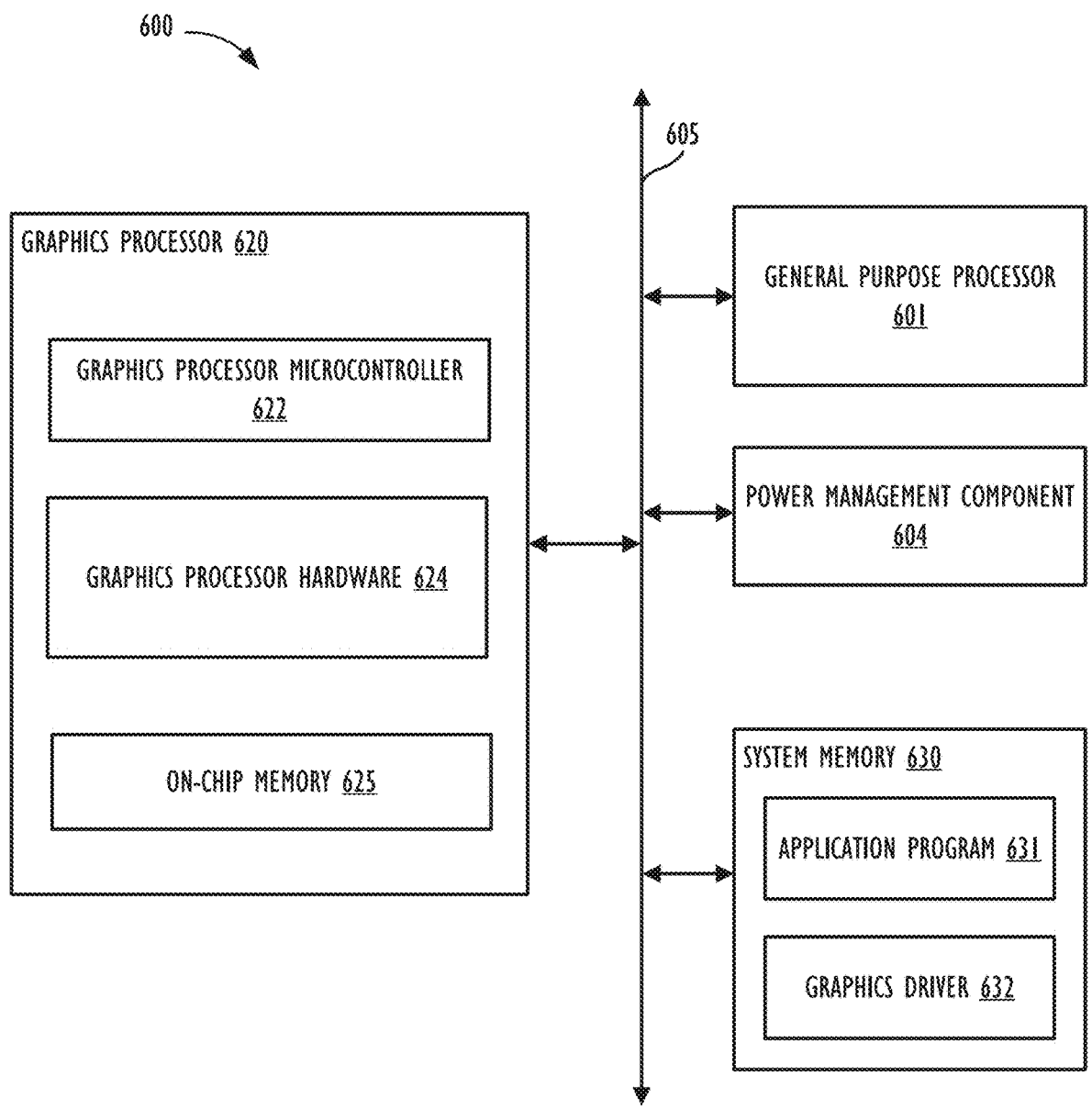
FIG. 6 is a block diagram of computing system configured to reorder commands submitted to a graphics processor.

FIG. 6 is a block diagram of computing system 600 configured to reorder commands submitted to a graphics processor. Computing system 600 includes a general purpose processor 601, a graphics processor 620 a power management component 604, and system memory 630. In one embodiment, general purpose processor 601 and graphics processor 620 are included on separate integrated circuits (ICs) or IC packages. In other implementations, however, general purpose processor 601 and graphics processor 620, or the collective functionality thereof, may be included in a single IC or package. Data bus 605 connects different elements of the computing system 600 including general purpose processor 601, a graphics processor 620 a power management component 604, and system memory 630. In an implementation, system memory 630 includes instructions that cause the general purpose processor 601 and/or graphics processor 620 to perform the functions ascribed to them in this disclosure. More specifically, graphics processor 620 can receive instructions transmitted by general purpose processor 601 and processes the instructions to render a graphics frame.

System memory 630 may include application program 631 and graphics driver 632. The graphics processor 620 in this example include a graphics processor microcontroller 622, graphics processor hardware 624, and on-chip memory 625. For example, a GPU can utilize the graphics processor hardware 624 to process vertex shaders, geometry shaders and fragment shaders. Application program 631 includes code written using a graphics API. Application program 631 generates API calls to render graphics frame. The computing system 600 also includes a power management component 604 to determine when to power on and off the graphics processor.

To be able to reorder commands submitted to graphics processor 620, the graphics driver 632 assigns a command to a graphics driver virtual channel based on a determination whether the command is resource dependent on a command allocated to an existing graphics driver virtual channel. For example, the graphics driver 632 can analyze the resource list for a current command and determine whether the current command depends on resources from a command previously allocated to a graphics driver virtual channel. If the current command depends on resources from a command previously allocated to the graphics driver virtual channel, the graphics driver 632 allocates the current command to the existing graphics driver virtual channel. If the currently analyzed command is not resource dependent on any of the commands previously allocated within existing graphics driver virtual channels, then the graphics driver 632 creates a separate graphics driver virtual channel and assigns the current command to a new and separate graphics driver virtual channel. Afterwards, the graphics processor microcontroller 622 obtains commands from the different graphics driver virtual channels as the commands become ready to submit for execution.

In one or more embodiments, the graphics driver 632 creates graphics driver virtual channels based on command dependencies and command types. The graphics processor 620 includes a variety of engines that perform operations in parallel using the graphics processor hardware 624. As an example, a command buffer 208 could include a render command that a vertex engine processes and a compute command that a compute engine processes. The graphics driver 632 is able to create independent graphics driver virtual channels for each command type. The graphics driver 632 can determine command dependencies for commands that have the same command type. If a current command depends on resources from a command previously allocated for an existing graphics driver virtual channel and has the same command type, the graphics driver allocates the current command to the existing graphics driver virtual channel. If the currently analyzed command is not resource dependent on any of the commands previously allocated within existing graphics driver virtual channels for the same command type, then graphics driver creates a separate graphics driver virtual channel with the same command type. Afterwards, graphics driver 632 assigns the current command to the created graphics driver virtual channel.

Illustrative Hardware and Software

The disclosure may have implication and use in and with respect to variety of electronic devices, including single- and multi-processor computing systems, and vertical devices (e.g., cameras, gaming systems, appliances, etc.) that incorporate single- or multi-processing computing systems. The discussion herein is made with reference to a common computing configuration for many different electronic computing devices (e.g., computer, laptop, mobile devices, etc.). This common computing configuration may have a CPU including one or more microprocessors and a graphics processing system including one or more GPUs. Other computing systems having other known or common hardware configurations (now or in the future) are fully contemplated and expected. While the focus of some of the implementations relate to mobile systems employing minimized GPUs, the hardware configuration may also be found, for example, in a server, a workstation, a laptop, a tablet, a desktop computer, a gaming platform (whether or not portable), a television, an entertainment system, a smart phone, a phone, or any other computing device, whether mobile or stationary, vertical, or general purpose.

Figure 7:
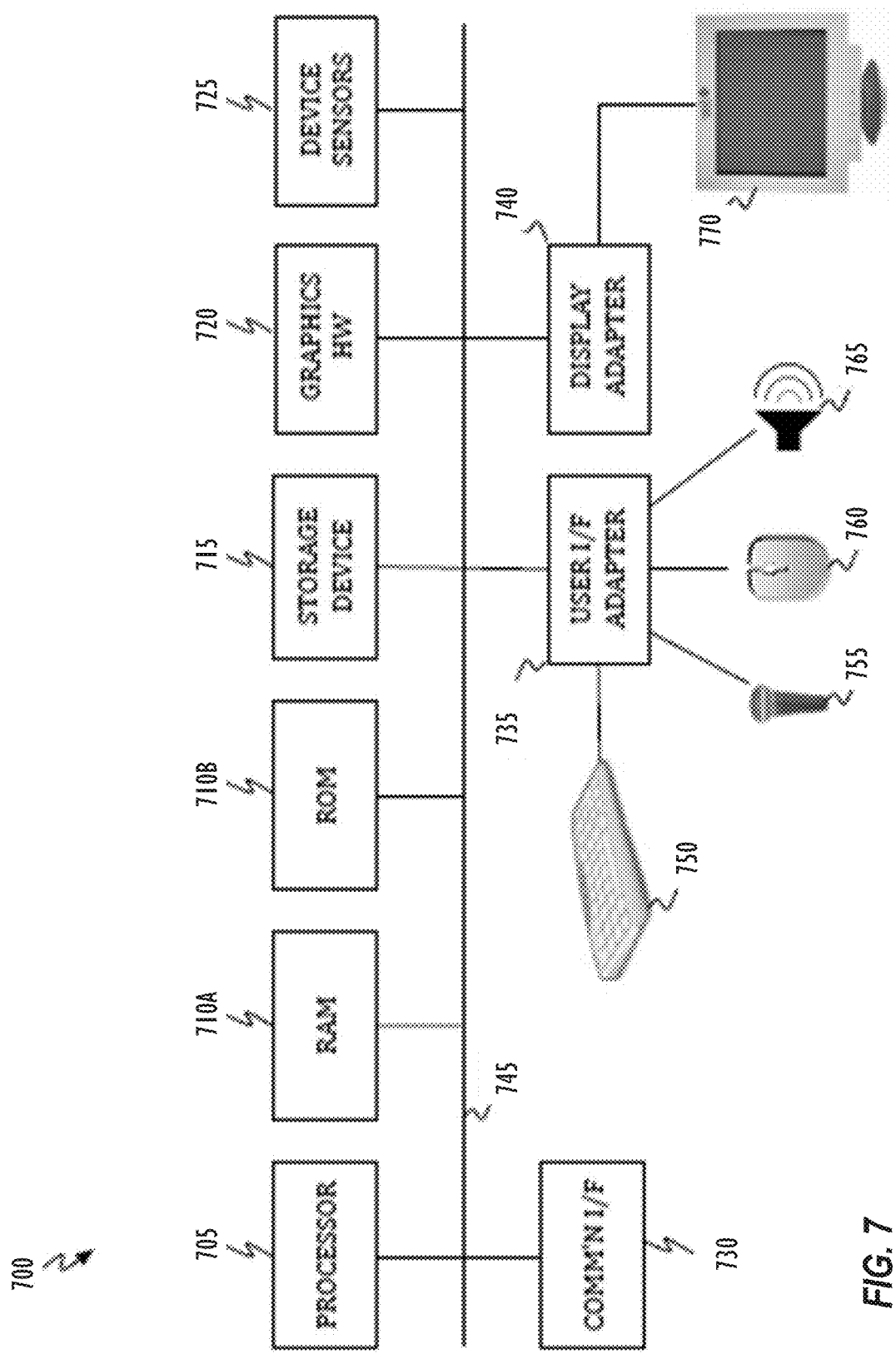
FIG. 7 is a block diagram of a computing system where embodiments of the present disclosure may operate.

Referring to FIG. 7, the disclosed implementations may be performed by representative computing system 700. For example the representative computer system may act as an end-user device or any other device that produces or displays graphics. For example, computing system 700 may be embodied in electronic devices, such as a general purpose computer system, a television, a set top box, a media player, a multi-media entertainment system, an image processing workstation, a hand-held device, or any device that may be coupled with or may incorporate display or presentation devices as discussed herein. Computing system 700 may include one or more processors 705, memory 710 (710A and 710B), one or more storage devices 715, and graphics hardware 720 (e.g., including one or more graphics processors). Computing system 700 may also have device sensors 725, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 7, system 700 may also include communication interface 730, user interface adapter 735, and display adapter 740—all of which may be coupled via system bus, backplane, fabric or network 745. Memory 710 may include one or more different types of non-transitory media (e.g., solid-state, DRAM, optical, magnetic, etc.) used by processor 705 and graphics hardware 720. For example, memory 710 may include memory cache, read-only memory (ROM), and/or random access memory (RAM). Storage 715 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), solid state storage drives, and Electrically Erasable Programmable Read-Only Memory (EEPROM). Memory 710 and storage 715 may be used to retain media data (e.g., audio, image, and video files), preference information, device profile information, computer program instructions organized into one or more modules and written in any desired computer programming language, and any other suitable data. When executed by processor 705 and/or graphics hardware 720, such computer program code may implement one or more of operations or processes described herein. In addition, the system may employ microcontrollers (not shown), which may also execute such computer program code to implement one or more of the operations or computer readable media claims illustrated herein. In some implementations, the microcontroller(s) may operate as a companion to a graphics processor or a general-purpose processor.

Communication interface 730 may include semiconductor-based circuits and may be used to connect computing system 700 to one or more networks. Illustrative networks include: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Apple lightning, Ethernet, WiFi®, Bluetooth®, USB, Thunderbolt®, Firewire®, etc.). (WIFI is a registered trademark of the Wi-Fi Alliance Corporation. BLUETOOTH is a registered trademark of Bluetooth Sig, Inc. THUNDERBOLT and FIREWIRE are registered trademarks of Apple Inc.). User interface adapter 735 may be used to connect keyboard 750, microphone 755, pointer device 760, speaker 765, and other user interface devices such as a touchpad and/or a touch screen (not shown). Display adapter 740 may be used to connect one or more displays 170.

Processor 705 may execute instructions necessary to carry out or control the operation of many functions performed by computing system 700 (e.g., evaluation, transformation, mathematical computation, or compilation of graphics programs, etc.). Processor 705 may, for instance, drive display 770 and receive user input from user interface adapter 735 or any other user interfaces embodied by a system. User interface adapter 735, for example, can take a variety of forms, such as a button, a keypad, a touchpad, a mouse, a dial, a click wheel, a keyboard, a display screen, and/or a touch screen. In addition, processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 in performing computational tasks. In some implementations, graphics hardware 720 may include CPU-integrated graphics and/or one or more discrete programmable GPUs. Computing system 700 (implementing one or more embodiments discussed herein) can allow for one or more users to control the same system (e.g., computing system 700) or another system (e.g., another computer or entertainment system) through user activity, which may include audio instructions, natural activity, and/or pre-determined gestures such as hand gestures.

Various implementations within the disclosure may employ sensors, such as cameras. Cameras and like sensor systems may include auto-focus systems to accurately capture video or image data ultimately used in a variety of applications, such as photo applications, augmented reality applications, virtual reality applications, and gaming. Processing images and performing recognition on the images received through camera sensors (or otherwise) may be performed locally on the host device or in combination with network accessible systems (e.g., cloud servers accessed over the Internet).

Returning to FIG. 7, device sensors 725 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis, and the analysis may be performed using the techniques discussed herein.

Output from the device sensors 725 may be processed, at least in part, by processors 705 and/or graphics hardware 720, and/or a dedicated image processing unit incorporated within or without computing system 700. Information so captured may be stored in memory 710 and/or storage 715 and/or any storage accessible on an attached network. Memory 710 may include one or more different types of media used by processor 705, graphics hardware 720, and device sensors 725 to perform device functions. Storage 715 may store data such as media (e.g., audio, image, and video files); metadata for media; computer program instructions; graphics programming instructions and graphics API resources; and other software, including database applications (e.g., a database storing avatar frames), preference information, device profile information, and any other suitable data. Memory 710 and storage 715 may be used to retain computer program instructions or code organized into one or more modules in either compiled form or written in any desired computer programming language. When executed by, for example, a microcontroller, GPU or processor 705, such computer program code may implement one or more of the acts or functions described herein (e.g., interpreting and responding to user activity including commands and/or gestures).

As noted above, implementations within this disclosure include software. As such, a description of common computing software architecture is provided as expressed in a layer diagram in FIG. 8. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 895 illustrating hardware layer 840, which may include memory, general purpose processors, graphics processors, microcontrollers, or other processing and/or computer hardware such as memory controllers and specialized hardware. Above the hardware layer is the operating system kernel layer 890 showing an example as operating system kernel 845, which is kernel software that may perform memory management, device management, and system calls. The operating system kernel layer 890 is the typical location of hardware drivers, such as a graphics processor drivers. The notation employed here is generally intended to imply that software elements shown in a layer use resources from the layers below and provide services to layers above. However, in practice, all components of a particular software element may not behave entirely in that manner.

Returning to FIG. 8, operating system services layer 885 is exemplified by operating system services 850. Operating system services 850 may provide core operating system functions in a protected environment. In addition, operating system services shown in operating system services layer 885 may include frameworks for OpenGL®/OpenCL™ 851, CUDA® or the like, Metal® 852, user space drivers 853, and a Software Rasterizer 854. (OPENCL is a registered trademark of Apple Inc. CUDA is a registered trademark of NVIDIA Corporation.) While most of these examples all relate to graphics processor processing or graphics and/or graphics libraries, other types of services are contemplated by varying implementations of the disclosure.

These particular examples also represent graphics frameworks/libraries that may operate in the lower tier of frameworks, such that developers may use shading and primitives and/or obtain fairly tightly coupled control over the graphics hardware. In addition, the particular examples named in FIG. 8 may also pass their work product on to hardware or hardware drivers, such as the graphics processor driver, for display-related material or compute operations.

Referring again to FIG. 8, OpenGL®/OpenCL™ 851 represent examples of well-known libraries and application programming interfaces for graphics processor compute operations and graphics rendering including 2D and 3D graphics. Metal® 852 also represents a published graphics library and framework, but it is generally considered lower level than OpenGL®/OpenCL™ 851, supporting fine-grained, low-level control of the organization, processing, and submission of graphics and computation commands, as well as the management of associated data and graphics API resources for those commands. User space drivers 853 is software relating to the control of hardware that exists in the user space for reasons that are typically related to the particular device or function. In many implementations, user space drivers 853 work cooperatively with kernel drivers and/or firmware to perform the overall function of a hardware driver. Software Rasterizer 854 refers generally to software used to make graphics information such as pixels without specialized graphics hardware (e.g., using only the CPU). These libraries or frameworks shown within the operating system services layer 885 are only exemplary and intended to show the general level of the layer and how it relates to other software in a sample arrangement (e.g., kernel operations usually below and higher-level applications services 860 usually above). In addition, it may be useful to note that Metal® 852 represents a published framework/library of Apple Inc. that is known to developers in the art. Furthermore, OpenGL®/OpenCL® 851 may represent frameworks/libraries present in current versions of software.

Above the operating system services layer 885 there is an application services layer 880, which includes Sprite Kit 861, Scene Kit 862, Core Animation 863, Core Graphics 864, and other applications services 860. The operating system services layer 885 represents higher-level frameworks that are commonly directly accessed by application programs. In some implementations of this disclosure the operating system services layer 885 includes graphics-related frameworks that are high level in that they are agnostic to the underlying graphics libraries (such as those discussed with respect to operating system services layer 885). In such implementations, these higher-level graphics frameworks are meant to provide developer access to graphics functionality in a more user/developer friendly way and allow developers to avoid work with shading and primitives. By way of example, Sprite Kit 861 is a graphics rendering and animation infrastructure made available by Apple Inc. Sprite Kit 861 may be used to animate textured images or "sprites." Scene Kit 862 is a 3D-rendering framework from Apple Inc. that supports the import, manipulation, and rendering of 3D assets at a higher level than frameworks having similar capabilities, such as OpenGL. Core Animation 863 is a graphics rendering and animation infrastructure made available from Apple Inc. Core Animation 863 may be used to animate views and other visual elements of an application. Core Graphics 864 is a two-dimensional drawing engine from Apple Inc., which provides 2D rendering for applications.

Above the application services layer 880, there is the application layer 875, which may comprise any type of application program. By way of example, FIG. 8 shows three specific applications: photos 871 (a photo management, editing, and sharing program), Quicken® 872 (a financial management program), and iMovie® 873 (a movie making and sharing program). (QUICKEN is a registered trademark of Intuit Inc. IMOVIE is a registered trademark of Apple Inc.). Application layer 875 also shows two generic applications 870 and 874, which represent the presence of any other applications that may interact with or be part of the inventive implementations disclosed herein. Generally, some implementations of the disclosure employ and/or interact with applications that produce displayable and/or viewable content or produce computational operations that are suited for GPU processing.

In evaluating operating system services layer 885 and applications services layer 880, it may be useful to realize that different frameworks have higher- or lower-level application program interfaces, even if the frameworks are represented in the same layer of the FIG. 8 diagram. The illustration of FIG. 8 serves to provide a general guideline and to introduce exemplary frameworks that may be discussed later. Furthermore, some implementations of the disclosure may imply that frameworks in application services layer 880 make use of the libraries represented in operating system services layer 885. Thus, FIG. 8 provides intellectual reinforcement for these examples. Importantly, FIG. 8 is not intended to limit the types of frameworks or libraries that may be used in any particular way or in any particular implementation. Generally, many implementations of this disclosure relate to the ability of applications in layer 875 or frameworks in layers 880 or 885 to divide long continuous graphics processor tasks into smaller pieces. In addition, many implementations of the disclosure relate to graphics processor (e.g., GPU) driver software in operating system kernel layer 890 and/or embodied as microcontroller firmware in hardware layer 895; such drivers performing a scheduling function for the graphics processor (e.g., GPU).

Figure 9:
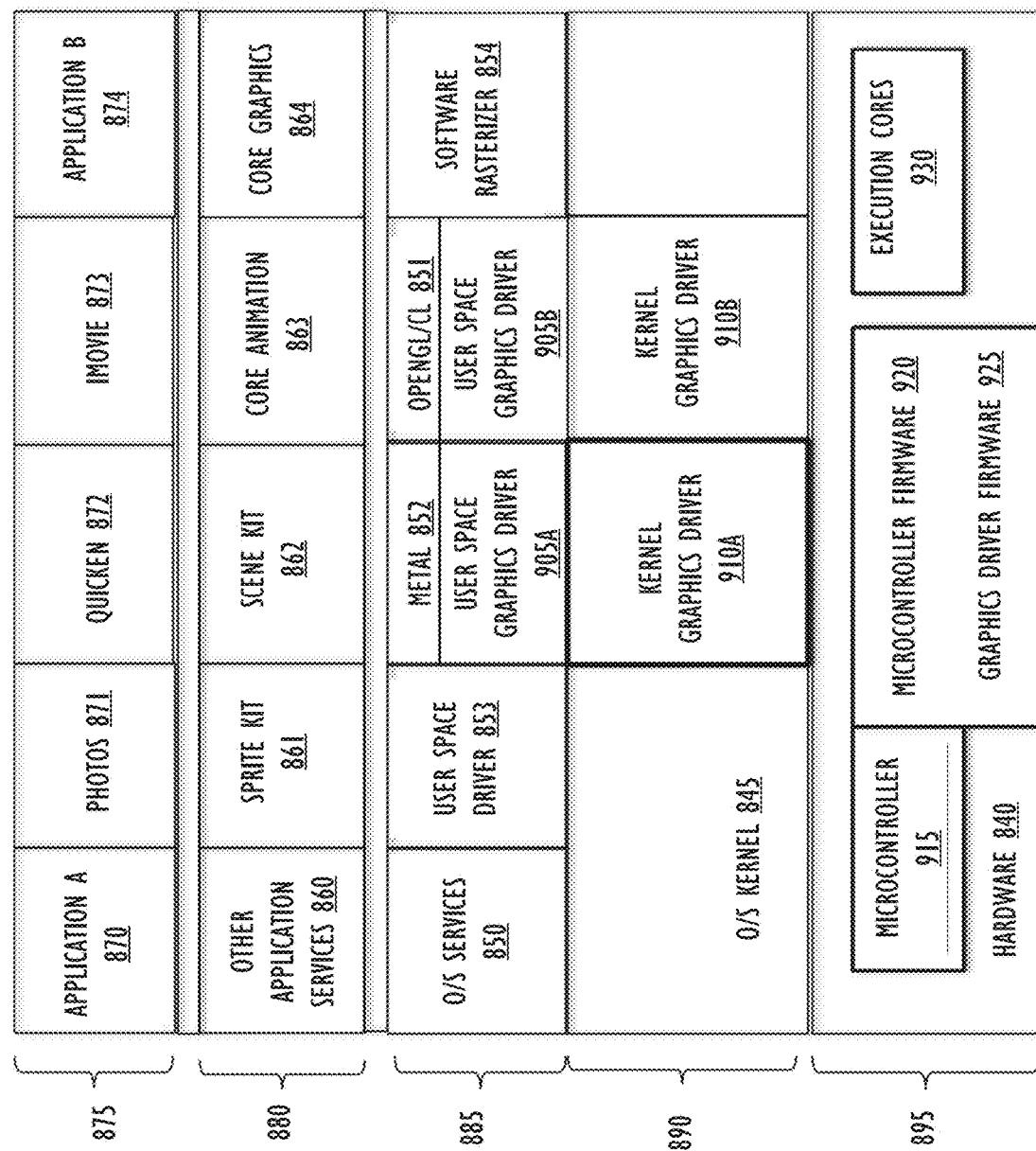
FIG. 9 is a block diagram of another embodiment of a software layer and architecture where implementations of the present disclosure may operate.

FIG. 9 illustrates a software architecture similar to the standard architecture shown in FIG. 8. By way of distinction, the architecture of FIG. 9 shows: user space graphics drivers 905A and 905B; kernel graphics drivers 910A and 910B in the operating system kernel 845; a microcontroller 915, accompanied by microcontroller firmware 920, including graphics driver firmware 925 in the hardware layer 840; and execution cores 930 in the hardware layer 840. The presence of multiple instances of a graphics driver (user space graphics drivers 905A and 905B, kernel graphics drivers 910A and 910B, and graphics driver firmware 925 in the microcontroller firmware 920) indicates the various options for implementing the graphics driver. As a matter of technical possibility any of the three shown drivers might independently operate as a sole graphics driver. In some implementations of the disclosure, the overall graphics driver is implemented in a combination of kernel graphics drivers 910A and 910B and graphics driver firmware 925 (e.g., in the operating system kernel 845 and the microcontroller firmware 920, respectively). In other implementations, the overall graphics driver may be implemented by the combined effort of all three shown drivers 905A and 905B, 910A and 910B, and 925.

At least one embodiment is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by one or more processors and comprising instructions stored thereon to cause the one or more processors to:
   receive a first command and a second command committed to a graphics processor for execution;
   allocate the first command to a first virtual channel that submits commands to the graphics processor for execution, wherein the first command is associated with a first set of resources;
   determine whether a second set of resources associated with the second command depends on the first set of resources, wherein each resource in the second set of resources represents a section of memory that relates to submitting the second command for execution on the graphics processor; and
   in accordance with a determination that the second set of resources depends on the first set of resources, allocate the second command to the first virtual channel.

2. The non-transitory program storage device of claim 1, wherein the instructions further cause the processors to in accordance with a determination that that the second set of resources does not depend on the first set of resources, create a second virtual channel that submits commands to the graphics processor for execution.

3. The non-transitory program storage device of claim 2, wherein the instructions further cause the processors to in accordance with the determination that that the second set of resources does not depend on the first set of resources, allocate the second command to the second virtual channel.

4. The non-transitory program storage device of claim 2, wherein the first command is associated with a first submission identifier and the second command is associated with a second submission identifier, and where the instructions further cause the processors to:
   determine whether the first command and the second command are in a ready state to submit to the graphics processor; and
   in accordance with a determination that that both the first command the second command in the ready state, submit the first command the second command to the graphics processor based on the first submission identifier and the second submission identifier.

5. The non-transitory program storage device of claim 1, wherein the first command and the second command have a first command type.

6. The non-transitory program storage device of claim 5, wherein the instructions further cause the processors to:
  receive a third command committed to the graphics processor for execution, wherein the third command has a second command type that differs from the first command type; and
  allocate, based on the second command type, the third command to a second virtual channel that submits commands to the graphics processor for execution.

7. The non-transitory program storage device of claim 6, wherein the second virtual channel is designated to only allocate commands that have the second command type.

8. The non-transitory program storage device of claim 6, wherein the first virtual channel is designated to allocate commands that have the first command type and does not allocate commands that have the second command type.

9. The non-transitory program storage device of claim 1, wherein the instructions further cause the processors to:
  receive a third command committed to the graphics processor for execution, the third command associated with a third set of resources;
  determining whether the third set of resources depends on the first set of resources and the second set of resources; and
  in accordance with a determination that the third set of resources does not depend on the first set of resources and the second set of resources:
    determine whether a number of existing virtual channels satisfies a virtual channel limit; and
    in accordance with a determination that the number of existing virtual channels satisfies the virtual channel limit, allocate the third command to one of the existing virtual channels based on a heuristic operation.

10. A system comprising:
  memory comprising instructions; and
  at least one processor coupled to memory, wherein the instructions, when executed, causes the at least one processor to:
    obtain a first command and a second command committed to a graphics processor for execution;
    assign the first command to a first graphics driver virtual channel that submits commands to the graphics processor for execution, wherein the first command is associated with a first set of resources, wherein the first graphics driver virtual channel submits commands from a graphics driver to a firmware for the graphics processor;
    determine whether a second set of resources associated with the second command depends on the first set of resources, wherein each resource in the second set of resources represents a section of memory for submitting the second command to the graphics processor; and
    in accordance with a determination that that the second set of resources does not depend on the first set of resources, assign the second command to a second graphics virtual channel that submits commands to the graphics processor for execution.

11. The system of claim 10, wherein the first graphics driver virtual channel submits commands from a kernel driver of the graphics driver.

12. The system of claim 10, wherein the instructions further cause the at least one processor to in accordance with a determination that the second set of resources depends on the first set of resources, assign the second command to the first graphics driver virtual channel.

13. The system of claim 10, wherein the first graphics driver virtual channel and the second graphics driver channel correspond to an engine type of the graphics processor.

14. The system of claim 13, wherein the engine type is one of the following: a vertex engine, a compute engine, or a three dimensional engine.

15. The system of claim 10, wherein the first graphics driver virtual channel is to be submitted to a first engine of the graphics processor and the second graphics driver channel is to be submitted to a second engine of the graphics processor, and wherein the first engine and the second engine are the same engine type.

16. The system of claim 10, wherein the first command and the second command have a first command type that correspond to an engine type of the graphics processor.

17. The system of claim 16, wherein the instructions further cause the at least one processor to:
  receive a third command committed to the graphics processor for execution, wherein the third command has a second command type that differs from the first command type; and
  assign, based on the second command type, the third command to a second virtual channel that submits commands to a second engine type of the graphics processor.

18. A computer-implemented method comprising:
  receiving a command buffer committed to a graphics processor for execution, wherein the command buffer includes a first command and a second command;
  queueing a first command to a first kernel driver virtual channel that submits commands to the graphics processor for execution, wherein the first command is associated with a first set of resources;
  determining whether a second set of resources associated with the second command depends on the first set of resources, wherein each resource in the second set of resources represents a section of memory that relates to submitting the second command for execution on the graphics processor; and
  queueing the second command to the first kernel driver virtual channel based on a determination that the second set of resources depends on the first set of resources.

19. The method of claim 18, further comprising queueing the second command to a second virtual channel that submits commands to the graphics processor for execution based on a determination that the second set of resources is independent of the first set of resources.

20. The method of claim 18, further comprising:
  receiving a third command committed to the graphics processor for execution, wherein the first command and the second command have a first command type that correspond to an engine type of the graphics processor, wherein the third command has a second command type that differs from the first command type; and
  queueing, based on the second command type, the third command to a second virtual channel that submits commands to a second engine type of the graphics processor.

* * * * *